(12) United States Patent
Grakist et al.

(10) Patent No.: US 9,112,415 B2
(45) Date of Patent: Aug. 18, 2015

(54) CONTROL OF A HALF RESONANT CONVERTER FOR AVOIDING CAPACITIVE MODE

(75) Inventors: Alfred Grakist, Oosterbeek (NL); Frans Pansier, Nuenen (NL)

(73) Assignee: NXP B.V., Eindhoven (NL)

( * ) Notice: Subject to any disclaimer, the term of this patent is extended or adjusted under 35 U.S.C. 154(b) by 857 days.

(21) Appl. No.: 12/678,296

(22) PCT Filed: Sep. 9, 2008

(86) PCT No.: PCT/IB2008/053632
§ 371 (c)(1),
(2), (4) Date: Mar. 16, 2010

(87) PCT Pub. No.: WO2009/037613
PCT Pub. Date: Mar. 26, 2009

(65) Prior Publication Data
US 2011/0187335 A1 Aug. 4, 2011

(30) Foreign Application Priority Data

Sep. 18, 2007 (EP) .................................... 07116676

(51) Int. Cl.
*G05F 1/00* (2006.01)
*H02M 1/32* (2007.01)
(Continued)

(52) U.S. Cl.
CPC . *H02M 1/32* (2013.01); *G05F 1/00* (2013.01); *G05F 1/40* (2013.01); *H02M 3/3376* (2013.01);
(Continued)

(58) Field of Classification Search
CPC .............. G05F 1/10; G05F 1/40; H02M 1/32

USPC ......... 323/222, 282, 283, 284, 271, 235, 243, 323/319, 288, 225, 290, 224, 285, 207, 234, 323/265
See application file for complete search history.

(56) References Cited

U.S. PATENT DOCUMENTS 5,680,034 A 10/1997 Redl
5,973,943 A 10/1999 Ribarich et al.
(Continued)

FOREIGN PATENT DOCUMENTS

JP 09322449 A 12/1997
WO 01/78468 A 10/2001
(Continued)

OTHER PUBLICATIONS

Anonymous; "UBA2014—600V Driver IC for HF Fluorescent Lamps"; Data Sheet; Philips; May 16, 2002.
(Continued)

*Primary Examiner* — Matthew Nguyen
*Assistant Examiner* — Trinh Dang (57) ABSTRACT

This invention relates to improved methods of preventing MOSFET damage in a resonant switched mode power converter (1) by preventing or limiting capacitive mode operation. A combination of response actions (respectively delaying MOSFET switch-on, adjusting switching phase, forcing a switch-on, and increasing frequency) is utilized. In the preferred embodiment, the voltage slope at the half-bridge node (5) is monitored, and in alternative embodiments the same or similar set of response actions is triggered by monitoring different signals, including: the resonant current polarity at switch-off or after the non-overlap time; the voltage of the to-be-switched-on" switch; and the voltage of the "just-switched-off" switch.

15 Claims, 5 Drawing Sheets

(51) Int. Cl.
*G05F 1/40* (2006.01)
*H02M 3/337* (2006.01)
*H02M 7/538* (2007.01)
*H05B 41/282* (2006.01)
*H05B 41/285* (2006.01)
*H02M 7/48* (2007.01)

(52) U.S. Cl.
CPC ....... *H02M 7/53803* (2013.01); *H05B 41/2828* (2013.01); *H05B 41/2856* (2013.01); *H02M 2007/4815* (2013.01); *Y02B 70/1433* (2013.01); *Y02B 70/1441* (2013.01)

(56) References Cited

U.S. PATENT DOCUMENTS

| | | | |
|---|---|---|---|
| 7,098,632 B2 * | 8/2006 | Chen et al. | 323/222 |
| 7,224,149 B2 * | 5/2007 | Endo | 323/222 |
| 2002/0190701 A1 * | 12/2002 | Miyazaki | 323/284 |
| 2004/0227471 A1 | 11/2004 | Ribarich | |
| 2007/0145907 A1 | 6/2007 | Hwang et al. | |

FOREIGN PATENT DOCUMENTS

| | | |
|---|---|---|
| WO | 03/055052 A1 | 7/2003 |
| WO | 2004/086463 A2 | 7/2004 |
| WO | 2006/103606 A | 10/2006 |

OTHER PUBLICATIONS

NXP; "TEA 1613—Resonant Power Supply Control IC With PFC—REV 1.04—Draft"; Objective Datasheet; Apr. 12, 2007; 49 Pages.

* cited by examiner

CONTROL OF A HALF RESONANT CONVERTER FOR AVOIDING CAPACITIVE MODE

FIELD OF THE INVENTION

This invention relates to energy converters. One particularly important class of energy converters to which this invention relates is Switched Mode Power Supply (SMPS).

BACKGROUND OF THE INVENTION

SMPSs typically convert alternating current voltage (for example from a mains supply) into stabilised direct current (DC) voltages required for circuits inside electrical and electronic devices such as televisions and the like. A resonant power supply is an SMPS topology that has efficiency and cost advantages for power levels of 100 Watts and above. There is an increasing interest in the use of resonant power supplies for example due to the increasing success of flat panel displays such as LCD panels and plasma panels.

In a resonant power supply the output power is controlled by modulating the switching frequency of the converter. The switching frequency determines the impedance of the resonant circuit (consisting of one or more inductors and capacitors) that is present between the input and output of the converter.

The high efficiencies achievable by resonant converters are, in part, the result of the zero-voltage switching (ZVS) of the switches, typically MOSFETs, in the converter. Zero-voltage switching refers to the fact that the MOSFETs are switched on only when there is no voltage across them. Zero-voltage switching is also referred to as soft-switching. In the case of very dynamically varying power demands or in error conditions, the zero-voltage switching condition can be lost: that is the MOSFETs may be switched on while there is a voltage across them.

Two levels of severity can be distinguished: firstly, hard switching may occur without the body diode of the complimentary MOSFET conducting. In this less severe situation the MOSFET switches will be hard-switched, which decreases the efficiency of the MOSFET, and the resultant increased losses in the converter can also produce overheating after some time. Secondly, hard-switching whilst the body diode of the complimentary MOSFET is still conducting, may occur. This type of hard switching is referred to as reverse-recovery switching, and is a more severe possible consequence of losing the zero-voltage switching condition: MOSFETs have a very limited robustness for this condition, and can be damaged very quickly.

It is useful to provide protection for the resonant converter against this harmful reverse-recovery switching. This protection is also called capacitive mode protection. Such protection increases the reliability of the power supply. The chance of failure due to unforeseen conditions is significantly reduced. It also simplifies the evaluation and design of the power supply because it will be much more robust against errors and stress tests.

Conventional methods of providing such protection will now be described, in the context of a typical resonant power supply.

Figure 1:
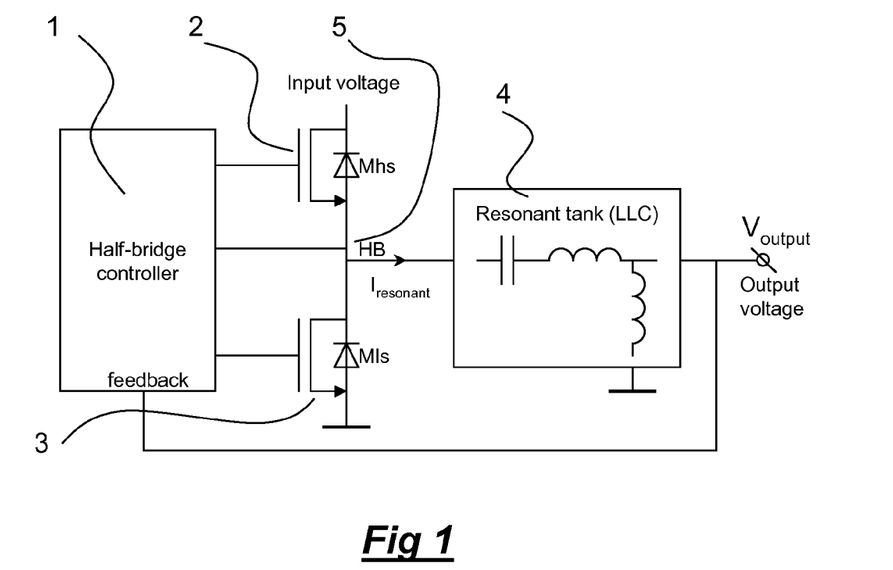
FIG. 1 illustrates the components of a known resonant circuit energy converter.

A resonant power supply is shown in FIG. 1. The half bridge controller 1 drives two MOSFET-switches Mhs and Mls 2 and 3 in a half-bridge configuration. That is, the switches are closed alternatively. After a switch is opened, and before the other switch is closed, there is a short time during which both switches are open: this is referred to as the non-overlap time. The half bridge controller uses the information of the output voltage $V_{output}$ to determine the switching frequency. The switching voltage from the half bridge ($V_{HB}$) is fed to the resonant tank 4. A typical resonant tank comprises two inductors and one capacitor and is thus referred to as a LLC resonant tank. The properties of this resonant tank together with the amplitude and frequency of the half bridge node determine the power delivered to the output.

Figure 2:
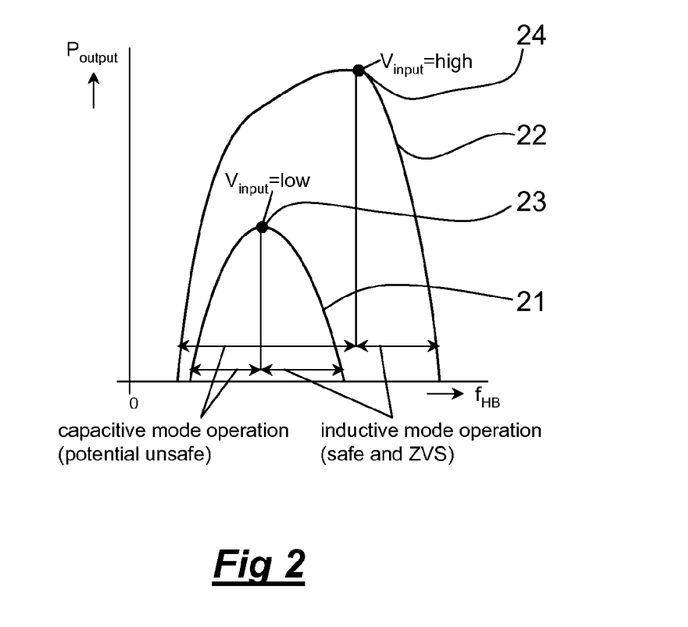
FIG. 2 illustrates the relationship between input voltage half bridge frequency and output power.

The operational range of such a LLC resonant power supply is depicted in FIG. 2. At a given input voltage ($V_{input}$), the output power ($P_{output}$) varies with the frequency of operation ($f_{HB}$). With increasing frequency, the output power reaches a peak and then falls to zero. The variation of output power with frequency is shown for two input voltage conditions—that for a low input voltage is shown as curve 21, and that for a high input voltage is shown as curve 22. For an intermediate input voltage, the operational curve will lie between these two limits, and will follow a similar profile, broadly corresponding in to an inverted parabola. The maximum power point—that is, the peak in the output power—for the low input voltage curves is shown at 23, and that for the high input voltage curve is shown at 24. As the figure shows, the frequency corresponding to the maximum power point is a function of the input voltage.

The resonant tank loads the half bridge. Since the resonant tank contains inductors and a capacitor, the total impedance can be either inductive or capacitive. For high frequencies—that is to the right of the maximum power point in the figure—the inductors dominate and the total impedance is inductive. This region of operation is called the inductive mode region. Operation in the inductive mode is preferred because an inductive load on the half bridge enables efficient zero-voltage switching. For low frequencies—that is, to the left of the maximum power point in the figure—the capacitor dominates and the total impedance is capacitive. This region of operation is called the capacitive mode region. With a capacitive impedance there is no zero-voltage switching. Reverse-recovery switching can occur and in this condition, the MOSFETs damage easily. Therefore the capacitive mode of operation is not the preferred mode. The boundary between capacitive and inductive impedance is near the top of the curve, which corresponds to the resonant frequency of the loaded LLC tank. It is preferred to operate close to—but always to the right of—the top of the curve, corresponding to the maximum power point. In general, the efficiency will be close to a maximum there (although the relationship between efficiency and output power is complex).

Figure 3:
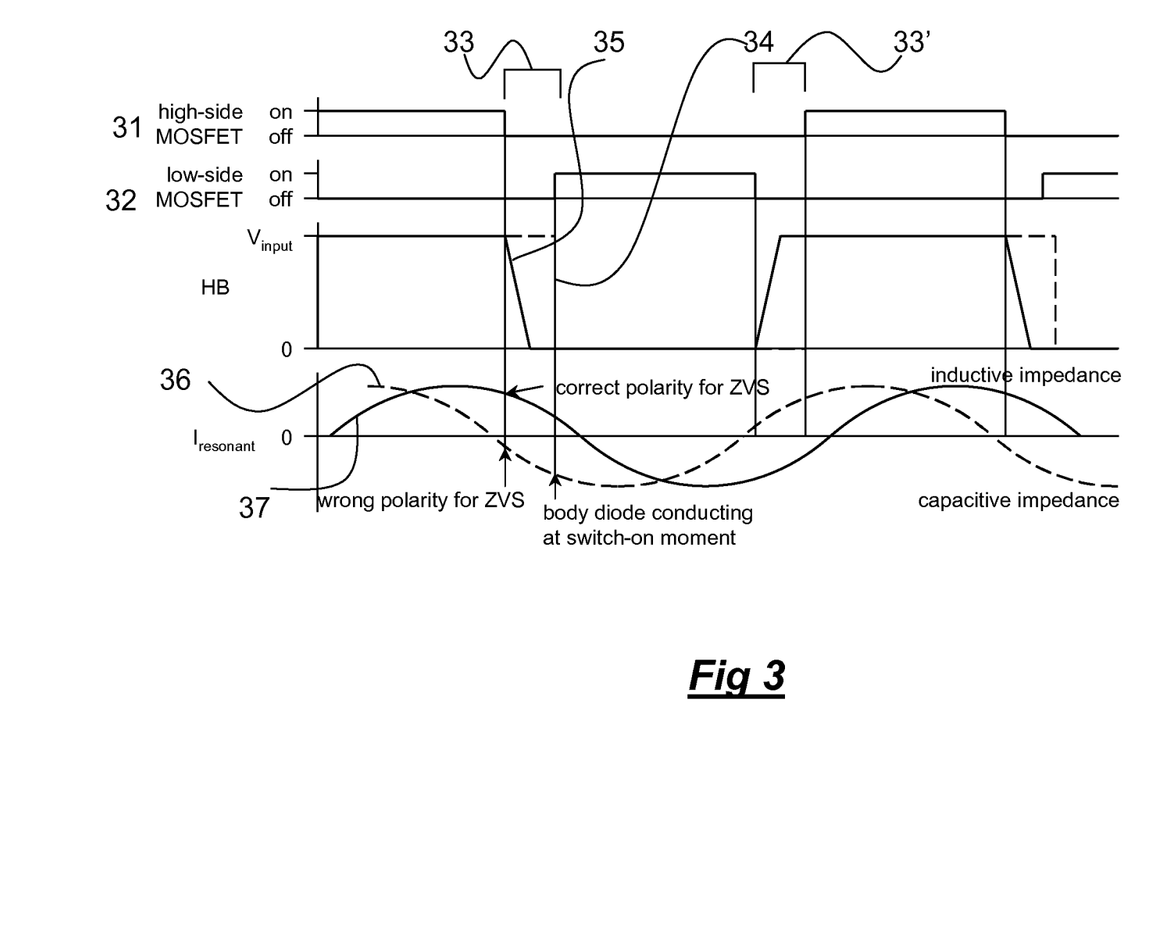
FIG. 3 shows the voltage at the half bridge node for a resonant circuit power supply operating in inductive and capacitive modes.

The relationship between the voltage at the half bridge point and a switching of the MOSFETs will now be described, for each of capacitive and inductive impedance situations, with reference to FIG. 3. FIG. 3 shows typical switching sequences 31 and 32 for the high side MOSFET (2) and low side MOSFET (3) of FIG. 1 respectively. A small non-overlap time 33 (also called dead time) is introduced between the on-time of the high-side MOSFET and that of the low-side MOSFET 3. A similar dead time 33' exists between the on-period of the low-side MOSFET 3 and that of the high-side MOSFET 2. The voltage for the half bridge point is shown, as trace 34, for the case of capacitive impedance and trace 35 for the case of inductive impedance. The current in the resonant tank ($I_{resonant}$) is shown by trace 36 and trace 37 for the capacitive and inductive impedances respectively.

When operating in inductive mode, once the high-side MOSFET 2 is switched off, the primary resonant current ($I_{resonant}$) discharges the capacitance of the half bridge from the input voltage to ground voltage, as shown in trace 35.

After this discharge, the body diode of the low-side MOSFET 3 starts conducting. The voltage across the low-side MOSFET 3 is now zero and this MOSFET can be switched on without switching loss. Similarly, after the low-side MOSFET 3 is switched off, the primary resonant current charges the half bridge point, enabling the high-side MOSFET 2 to be switched on without switching loss.

In capacitive mode (where the switching frequency is below the resonant frequency) the current shown by trace 36 has the wrong polarity for zero-voltage switching. Instead of a voltage transition at the half bridge point, the body diode of the switched-off high-side MOSFET continues to conduct a current. This body diode in the high-side MOSFET is still conducting when the low-side MOSFET is switched on after the non-overlap time. Switching on of the low-side MOSFET results in a fast voltage step at the half bridge point (that is, there is no zero-voltage switching). The body diode in the high-side switch is now forced to block very quickly. However, because of reverse-recovery properties of the MOSFET, the body diode will not block immediately and a reverse current will flow. This high reverse current can trigger the parasitic bipolar transistor in the switched off high-side MOSFET to cause a short of the input voltage and a failure of one or other or both of the MOSFETs.

There is thus a need to prevent or limit reverse-recovery switching in resonant energy converters. Conventional methods of providing such protection include monitoring a signal and increasing the operation frequency of the device if required. For example the amplitude of the resonant current may be monitored, and if the amplitude exceeds a defined level the frequency of operation is increased either stepwise or by a gradual increase. This principle is in common use in resonant power supplies. This type of over-current/power protection limits further frequency reduction corresponding to moving further to the left, up the frequency/power curve and above a defined current/power value. This solution prevents capacitive mode operation in many cases, but not always. During high load steps or short circuit at the output, capacitive mode operation with reverse-recovery switching can still occur.

A further method of limiting capacitive mode operation is to monitor the current polarity of the resonant tank current; if the wrong polarity is evident at the switch-on moment, the frequency of operation is adjusted. This protection method is used in controllers, for example for lighting ballasts (such as device UBA2021 supplied by NXP Semiconductors). If the current has the wrong polarity the frequency will be increased. This method will prevent the converter from moving into the capacitive mode operation, but works only for relatively slow changing conditions. For fast changes, capacitive mode operation will still occur for some time. Another disadvantage is that the harmful reverse-recovery switching in capacitive mode is not entirely prevented; only the duration during which it will occur is limited. Since MOSFETs can fail quickly by reverse-recovery switching, this is not a fail-safe solution.

A further conventional protection method is to monitor the slope of the voltage at the half bridge node; if the voltage does not start to slope shortly after a switch off of the relevant MOSFET the operation frequency is increased. This protection method is also used in controllers for lighting ballasts (such as NXP Semiconductors' UBA2014). In the preferred inductive mode, the voltage slope starts directly after a MOSFET is switched off. If the slope does not start within a predefined (short) time the other MOSFET is forced to switch on and the switching frequency is increased to a high value. This protection method ends capacitive mode operation quickly by stepping back into an inductive mode. One disadvantage is that a harmful reverse-recovery switching cycle will still occur at least once. A second disadvantage is the (long) required time to return to normal operation at nominal switching frequency, after the frequency has been increased.

A further method of limiting capacitive mode operation is disclosed in patent application publication WO 01/78468. In this method the voltage step at the half bridge point which occurs when a MOSFET is switched on is monitored; the operational frequency is increased by an amount which depends on the amplitude of the hard switching. In the preferred inductive mode the zero-voltage switching condition will exist, and no voltage step at all will occur. However in capacitive mode or near capacitive mode, the zero-voltage switching condition is lost and hard-switching, with a voltage step, will occur. The amplitude of this voltage step is measured and the value of the voltage step determines the increase of frequency. This method will prevent the converter from moving into the capacitive mode frequency range, but is only effective for relatively slow changing conditions. For fast changes capacitive mode operation can still occur for a short period. Thus capacitive mode switching is not entirely prevented: only its duration is limited.

A further method which is used to prevent or limit capacitive mode switching is to monitor the voltage across the switch which is about to be switched on. If the voltage across the switch is higher than a predetermined fixed value, the switch-on moment of the MOSFET is delayed and the frequency is increased. For the low side switch the voltage across the switch corresponds to the half bridge voltage; for the high-side switch the voltage is the difference between the input voltage and the half bridge voltage. In zero-voltage switching conditions (that is in inductive mode) the voltage across the MOSFET is low at the moment the MOSFET is switched on. A circuit can be added to measure the voltage across the MOSFET, which thus prevents the switching on of the MOSFET as long as the voltage across it is not below a predetermined value. This protection solution is always effective at preventing reverse-recovery switching in capacitive mode and thereby protects the MOSFETs effectively against this failure mechanism. However, because the detection is related to an absolute fixed voltage level, it will only operate for a limited input voltage range. Further, the protection operates independently from the half bridge controller.

SUMMARY OF THE INVENTION

It is an object of the present invention to provide improved protection in an energy converter which provides protection against failure of the MOSFETs due to capacitive mode operation.

According to a first aspect of the invention there is provided a method for controlling an energy converter having a switching frequency and a switching phase, a first switch, a second switch and a half-bridge node therebetween, the method comprising opening the first switch whilst the second switch is open, monitoring a parameter indicative of a state of the energy converter, and both (a) delaying closing the second switch and (b) retarding the switching phase in response to the parameter exhibiting a first characteristic when the first switch is opened.

Preferably the method comprises the further step of (c) closing the second switch at the end of a first predetermined period which starts immediately after the first switch is opened in response to the parameter exhibiting the first characteristic throughout the first predetermined period. Beneficially, time-out functionality ensures the continued operation of the device under some conditions.

Advantageously the method may comprise the further step of (d) increasing the switching frequency in response to the parameter exhibiting the first characteristic throughout a second predetermined period which starts immediately after the first switch is opened Thus moving to inductive mode operation may be ensured.

Preferably the step (a) includes the further step of (e) closing the second switch in response to the parameter exhibiting a second characteristic within a third predetermined period which starts immediately after the first switch is opened. Thus, for example, detection of an end-of-voltage-slope may be used to trigger switching of the second switch.

Advantageously the energy converter may further comprise an oscillator, and the step of retarding the switching phase of the first switch and the second switch comprises interrupting oscillation of the oscillator. Beneficially, interrupting or holding the oscillator may in some circumstances preclude the need for increasing the frequency.

Optionally the first characteristic is an absence of a start of a non-zero voltage slope at the half-bridge node, and the second characteristic is an end of a non-zero voltage slope at the half-bridge node. Beneficially start and end of voltage slopes are particularly convenient parameters to measure.

As an alternative option, the first characteristic is an undesired polarity of a current in the resonant circuit and the second characteristic is an opposite polarity of the current in the resonant circuit. In this case, preferably the undesired polarity is the polarity which tends to prevent the half-bridge node from discharging or charging upon opening the high side switch or the low side switch respectively.

The second predetermined period may be of zero duration.

As a further alternative option, the energy converter has an input voltage, the parameter is the voltage across the second switch, the first characteristic is a voltage across the second switch which is not less than half the input voltage and the second characteristic is a voltage across the second switch which is less than half the input voltage. Alternatively, the parameter may be the voltage across the first switch, the first characteristic is a voltage across the first switch which is not greater than half the input voltage and the second characteristic is a voltage across the first switch which is greater than half the input voltage. Beneficially, use of a variable voltage, determined by the input voltage, avoids the problems associated with prior art energy converters which rely on an independently fixed reference voltage. However, the invention extends to use of an independently fixed voltage or reference voltage.

According to a further aspect of the invention there is provided an energy converter having a switching frequency and a switching phase, a first switch and a second switch and a half-bridge node therebetween and adapted to be controlled by a method as described above in accordance with the method of the first aspect of the invention. The energy converter may form part of a switched mode power supply.

These and other aspects of the invention will be apparent from, and elucidated with reference to, the example embodiments described hereinafter.

BRIEF DESCRIPTION OF DRAWINGS

Embodiments of the invention will be described, by way of example only, with reference to the drawings, in which.

DETAILED DESCRIPTION OF EMBODIMENTS

The first preferred embodiment of the present invention comprises a resonant circuit power supply of the kind shown schematically in FIG. 1. As described above, high-side and low-side MOSFETs 2 and 3 are controlled by a half bridge controller 1. The half bridge node between the high-side and low-side MOSFETs supplies a resonant tank 4. Typically the resonant tank comprises an LLC circuit. The output voltage $V_{output}$ is used as feedback for the half bridge controller, as is the voltage at the half bridge node 5. In this embodiment the voltage, and in particular the voltage slope, at the half bridge node is monitored. As will be described below, depending on the state of the voltage and voltage slope, one or more of four response actions may be taken. These are:

firstly, to delay the switch on moment of the relevant MOSFET;

secondly, to adjust the switching phase of the controller, by holding the oscillator;

thirdly, to force a switch-on of the relevant MOSFET; and, fourthly, to increase the operational frequency.

The criteria by which it is determined whether and which of these responses are taken will now be described The chronological order in which they occur may not correspond to the list of response actions given above, but for clarity they will be referred to hereinafter according to their position in the above list (Action 1, Action 2, etc).

Firstly, if no slope in voltage at the half bridge node is detected immediately after switch-off of the MOSFET, two responses are made: (a) the switching phase of the controller is adjusted, by holding the oscillator ("Action 2"). This has the effect of merely retarding the phase of the oscillator and thus although it extends this specific cycle does not have an effect on the underlying operating frequency; (b) The other response action is to start a timer which will force a switch on of the relevant MOSFET if the correct voltage slope has not occurred after a predetermined "timeout" period ("Action 3"). This ensures continued operation of the energy converter.

The voltage and voltage slope are continually monitored; note that in this embodiment, the voltage at the half-bridge node 5 is differentiated using a capacitor (not shown), to produce a current. This resultant current (which is thus a measure of the slope of the voltage) is used in the detection circuit. So, in this embodiment, only the voltage slope information is used. In contrast, in other embodiments, the voltage information itself is used in a comparator circuit.

If the voltage slope has not commenced within a predetermined short time after switching off the MOSFET a further response action is taken. This response action comprises increasing the operational frequency of the device. ("Action 4"). This predetermined short time will typically be small with respect to the energy converter's switching period, but may be a significant part of the switching period. Further, the action may be taken immediately after the MOSFET is switched off, such that the predetermined short time is of zero duration.

If the monitoring means, which may be implemented in hardware or software, do not detect the end of a voltage slope at the half bridge node after switch off of the MOSFET, the following response action is taken: the switch-on moment of the relevant MOSFET is delayed. The reason that this is an appropriate response is that in order for an end of the slope to be detected the slope must have started first. Thus, the half bridge node must have discharged (in the case of the high-side MOSFET being switched off) or charged (in the case of the low-side MOSFET being the MOSFET which is switched off): "Action 1".

Although control circuits are known which produce either response Action 4 (increasing the converter frequency), or response Action 1 (delaying the switch-on moment), the inventors have appreciated that it can be particularly beneficial to provide a control which combines delaying the switch-on moment with adjusting the switching phase. It has been found to be similarly beneficial to combine this with sensing the voltage slope. In particular, the method may be conveniently integrated into an IC (integrated circuit), and has enhanced behavioural predictability.

Figure 4:
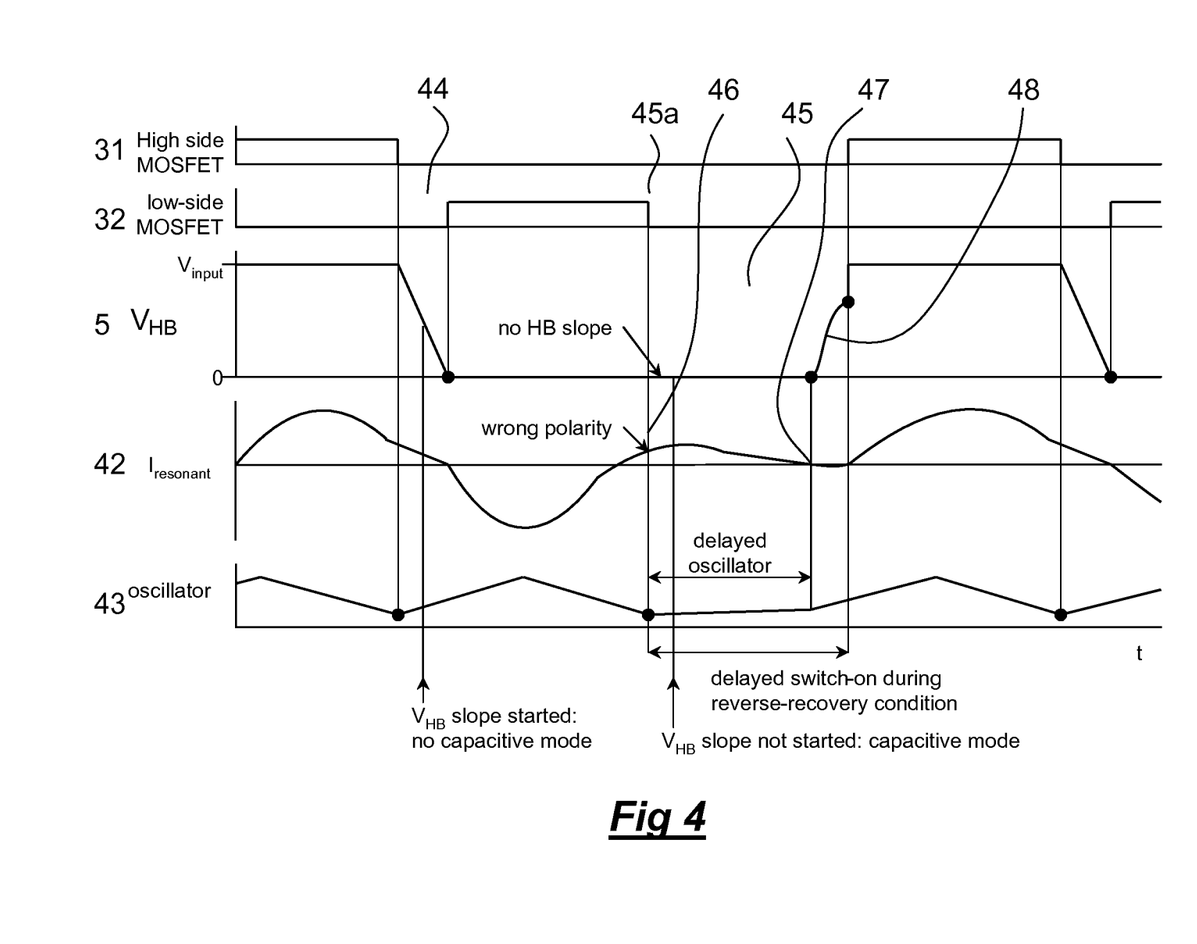
FIG. 4 shows the voltage of the half bridge node and the resonant current, for a resonant circuit power supply operated in accordance with one embodiment of the present invention.

The operation of an energy converter according to this embodiment will now be described, as shown diagrammatically in FIG. 4. FIG. 4 shows the on and off states of the high-side MOSFET (2) and low-side MOSFET (3) at 31 and 32 respectively. It also shows the voltage at the half bridge point 5 along with the primary resonant current ($I_{resonant}$) 42, and the oscillator voltage 43.

During the first non-overlap time 44, from high-side on to low-side on, normal zero-voltage switching operation is shown. The non-overlap time can be a fixed time or it can be dependant on the half bridge voltage slope. In the latter case it is monitored when the half bridge voltage slope ends, which is an indication that the MOSET can now be switched on. This "half bridge slope dependant non-overlap time", which may also be referred to as an adaptive non-overlap time, is known by itself and has been used for instance in lighting controllers such as UBA2014 supplied by NXP Semiconductors.

At the start 45a of the next non-overlap time 45, from low-side on to high-side on, the protection from destructive reverse-recovery switching according to this embodiment of the invention is shown. When the low-side MOSFET 3 is switched off, the current in the resonant circuit has the wrong—that is, in this instance, positive—polarity 46 because the converter is operating in capacitive mode. The body diode of the low-side MOSFET 32 conducts the resonant current, and there is thus no rising voltage slope at the half bridge node. As a result, the two response actions described above are taken:

1. The high-side MOSFET is not switched on. This protects the low-side MOSFET 32 against destructive reverse-recovery switching. ("Action 1")
2. The oscillator is delayed. The oscillator determines the frequency of the resonant converter. Normally the oscillator is continuously running. Until the half bridge slope starts, the oscillator is interrupted or held, for instance by reducing the charge current. In this way the switching phase of the controller is adjusted.

It should be noted that delaying the oscillator in this way does not directly change the operating frequency of the energy converter, but merely retards the phase. Thus this action of itself does not alter the operation mode from capacitive to inductive. ("Action 2").

During the extended non-overlap period 45 the current continues to resonate and will change to the correct polarity (in this case negative) after some time. The body diode in the low-side MOSFET 32 will stop conducting and the risk of reverse-recovery switching will have gone. This moment is shown at 47 in FIG. 4. Thereafter, the current starts to charge the half bridge node, as depicted in 48, and this is detected. The oscillator delay is terminated, and as a result the oscillator will continue at its normal (charge) speed. The high-side MOSFET 31 is switched on when the voltage slope at the half bridge node has ended. This completes the action described above as "Action 1".

For the high-side MOSFET to switch on, the end of a half bridge node voltage slope must be detected. Thus if no end-of-slope is detected, the MOSFET is not be turned on, and the converter stops functioning. To prevent this and ensure that the MOSFET will always be switched on, a timeout function is provided. The MOSFET will be switched on after this timeout, even if no half bridge node voltage slope is detected. This timeout can also be realised by the delayed oscillator. The MOSFET is forced to switch on when the oscillator capacitor is fully charged. Thus, a safeguard is provided, since normally the MOSFET will switch on before the oscillator capacitor is fully charged. ("Action 3")

As described above, the MOSFET control prevents the destructive reverse-recovery switching if the resonant converter is operating in capacitive mode. It does not, however, bring the converter back into inductive mode. Therefore an additional measure is needed. This is increasing the operational frequency ("Action 4"). Since increasing the frequency is a relatively slow action the energy converter will not transfer to inductive mode from capacitive mode immediately. However, the control methodology described above ensures that the resonant converter will operate safely in capacitive mode during the intervening period. Thus the MOSFETs are always protected for reverse-recovery switching.

To determine whether capacitive mode operation is occurring, monitoring for the commencement of the half bridge node voltage slope within a short time after the MOSFET switch off moment is performed. If the converter is operating in capacitive mode, the half bridge node voltage slope does not start within this period, and this information can then be used to increase the frequency. In this way the frequency will be increased until inductive mode operation is restored.

Around the resonant frequency, at the border or boundary between inductive and capacitive mode, the amplitude can be too small to fully charge (or discharge, respectively) the half bridge node voltage. For control algorithms that monitor the half bridge node voltage level, there can be conditions where the protection will not work, because the input voltage is too low, or where the protection executes the actions when it is not necessary. A protection method as described above, according to this embodiment of the present invention, using the half bridge voltage node slope, avoids these disadvantages.

According to a second embodiment, a control algorithm is based around monitoring the voltage slope at the half bridge node, but does not rely on the end of slope monitoring. In this embodiment, the principal criterion is whether a voltage slope starts immediately after switch-off of one MOSFET. If no voltage slope is detected, the system is determined to be in capacitive mode, and the following three response actions are all taken:

1. The switch on moment of the relevant, other, MOSFET is delayed. This prevents hard switching of this MOSFET on this cycle.
2. The switching phase of the controller is retarded by holding the oscillator. As described above, this does not directly change the operation frequency, but provides a period during which the resonant current may change polarity and the voltage at the half bridge node start to acquire the correct slope.

3. A switch-on of the relevant, other, MOSFET is forced in the circumstance where the correct voltage slope does not occur after a time-out.

If the half bridge node has not obtained the correct voltage slope within a short time after the switch off a further response action is taken: to increase the operational frequency.

Thus, this second embodiment is a simplification of the first preferred embodiment described above. It switches the other MOSFET on as soon as the risk of reverse recovery switching has gone (that is, at the start of the half bridge node voltage slope). In contrast, the first embodiment described above waits for the minimum amplitude of the voltage across the switch (corresponding to the end of the half bridge node voltage slope), and thereby minimises switching losses.

According to a third embodiment of the present invention, the current polarity in the primary resonant circuit is monitored instead of the voltage slope at the half bridge node. From inspection of FIG. 3 it can be seen that there is a relationship between the polarity of the primary resonant current ($I_{resonant}$) and the slope of the voltage at the half bridge node during the non-overlap periods 33 and 33'. In capacitive mode operation, after the high-side MOSFET 2 is switched off, the half bridge node voltage ($V_{input}$) is prevented from collapsing if the polarity of the resonant current is negative. Similarly, after the low-side MOSFET 3 is switched on the voltage at the half bridge node is prevented from rising if the resonant current has a positive polarity. However, as shown in FIG. 4, during the non-overlap time after the low-side MOSFET 2 is switched off, should the resonant current fall below zero and thus obtain a negative polarity (as shown at 47) the half bridge node will start to be charged as shown at 48. Thus the polarity of the resonant current at the switch-off moment and at the end of the overlap time may be used, instead of the voltage slope at the half bridge node, to provide most of the functionality described in the first embodiment above.

The control methodology for this embodiment will now be described. If the current of the resonant circuit has the wrong polarity at the switch-off moment then the following actions are taken:

1. The switch-on moment of the other MOSFET is delayed as long as the current has the wrong polarity;
2. The switching phase of the controller is retarded by holding the oscillator;
3. If the correct current polarity does not occur after a predetermined time-out period, the relevant, other, MOSFET is forced to switch on; and
4. The frequency of operation is increased.

A fourth embodiment of the present invention is realised in a similar way to the third embodiment described above, but in this case, the parameter which is monitored is the voltage across the switch which is about to be switched on. (That is, when the high side MOSFET 31 has just been switched off, as shown towards the left of FIG. 4, the voltage across the low side MOSFET is monitored). The characteristic, or criterion, which is used to trigger the response actions is in this case a voltage across the relevant MOSFET which is greater than half the input voltage (i.e. $>V_{input}/2$). Thus when the high side MOSFET has just been switched off, the criterion is that:

$V_{HB} > V_{input}/2$

Similarly, when the low side MOSFET has just been switched off, the criterion is that:

$V_{HB} < V_{input}/2$.

If this criterion is met, the same four response actions are taken as in the third embodiment:

1. The switch-on moment of the MOSFET is delayed as long as the voltage (across the relevant MOSFET) is too high;
2. The switching phase of the controller is retarded by holding the oscillator;
3. If the correct voltage does not occur after a predetermined time-out period, the relevant MOSFET is forced to switch on; and
4. The frequency of operation is increased.

Use of the input-dependant voltage in this embodiment solves the disadvantage of the limited input voltage range, which is associated with prior art methods using an independently fixed reference voltage.

A fifth embodiment is very similar to the fourth embodiment, except that in this case, the voltage across the other switch (MOSFET) is monitored. The criterion used may be either that the voltage is below an independent fixed voltage, or that the voltage is less than half the input voltage. The operation of the method is directly analogous to that of the fourth embodiment.

Figure 5:
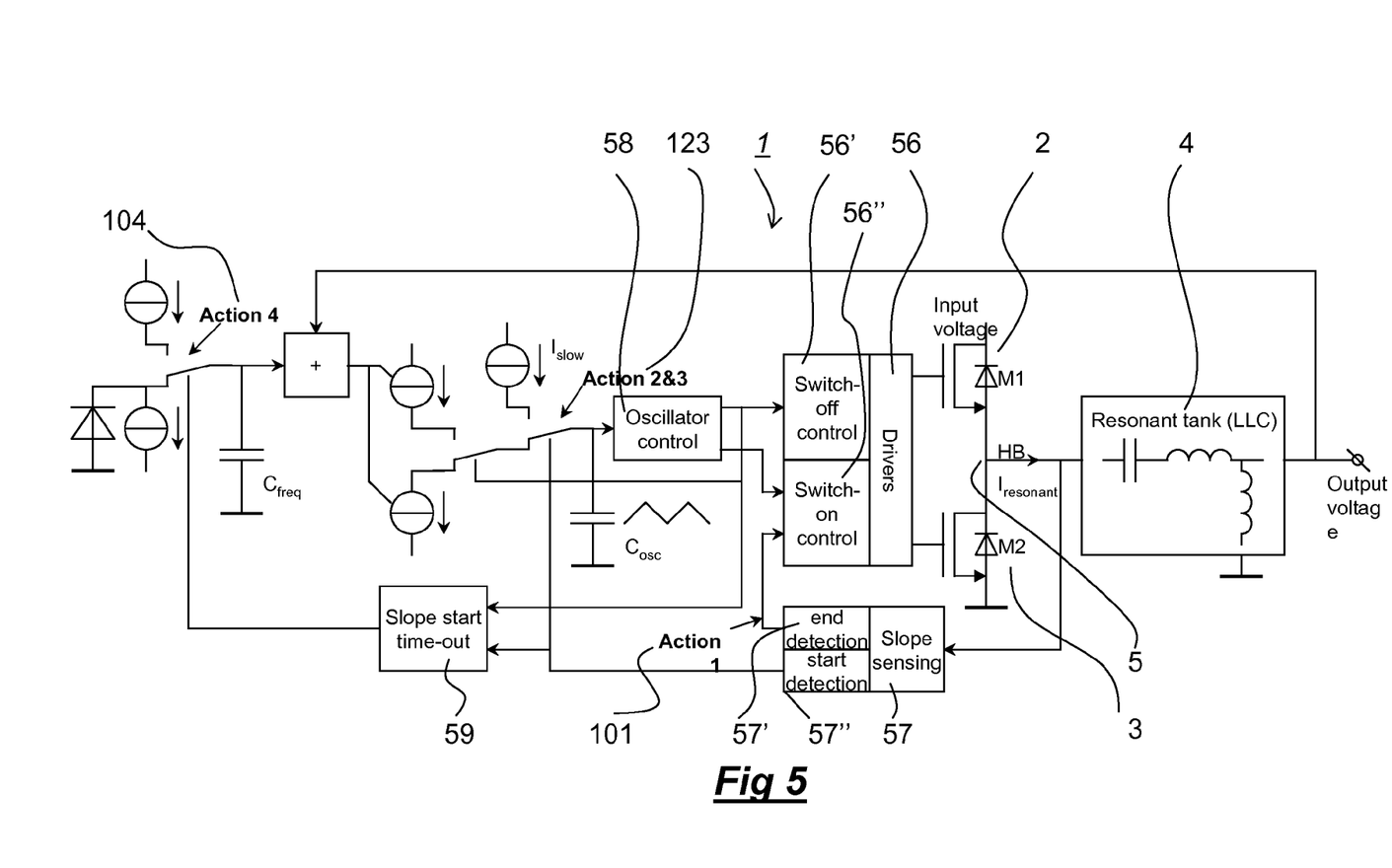
FIG. 5 shows an implementation of a method according to the one embodiment of the present invention.

FIG. 5 depicts schematically a block diagram of a circuit implementing the control algorithm according to the first preferred embodiment described above. An energy converter as shown in FIG. 1 is depicted having a half bridge controller shown generally as 1, controlling a high-side, typically MOSFET, switch 2 and a low-side, typically MOSFET, switch 3 between which there is a half bridge node point 5. A resonant tank (LLC) 4 lies between the half bridge node and the output. The half bridge controller 1 comprises MOSFET drivers 56 including switch-off control 56' and switch-on control 56"; the half bridge node is connected to slope sensing means 57 including end detection sensing means 57' and start detection sensing means 57"; the end detection sensing means 57' provides feedback to the drivers 56. The start detection sensing means 57" is connected to an oscillator control 58, and to a slope start timeout unit 59.

The response actions are effected as follows:

To delay the switch on moment of the MOSFET the half bridge voltage slope is sensed at 57 and the end of the slope is determined at 57'. With this information the MOSFET is switched on. (This is shown on the figure as "Action 1").

To adjust the switching phase of the controller by holding the converter, the start of the half bridge voltage slope is detected at 57". Until the start of the slope is detected the oscillator capacitor ($C_{OSC}$) is charged by a small current ($I_{slow}$). As long as the start of the half bridge voltage slope is not detected, the oscillator capacitor is continually charged by this small current. After a relatively long period, the capacitor will be charged to an upper switching level and the switch will be forced to switch on. Thus, as shown at 123, both the second action ("Action 2"), that of adjusting the switching phase of the controller by holding the oscillator, and a third action ("Action 3"), that of forcing a switch on when the correct voltage slope doesn't occur after a time-out, are effected.

The fourth action, as depicted at 104 ("Action 4"), is to increase the frequency: if the half bridge node voltage slope does not start within a short time after the MOSFET switch off moment, the frequency is increased slowly by charging capacitor $C_{freq}$. (Note that the "slope start time-out" 59 shown here is not that described above with reference to forcing the switch-on after a time-out in order to prevent the converter from completely stalling or stopping). Together with the information from the output voltage, the voltage on this capacitor $C_{freq}$ determines the oscillator frequency: the higher the voltage at $C_{freq}$, the higher the oscillator frequency.

Figure 6:
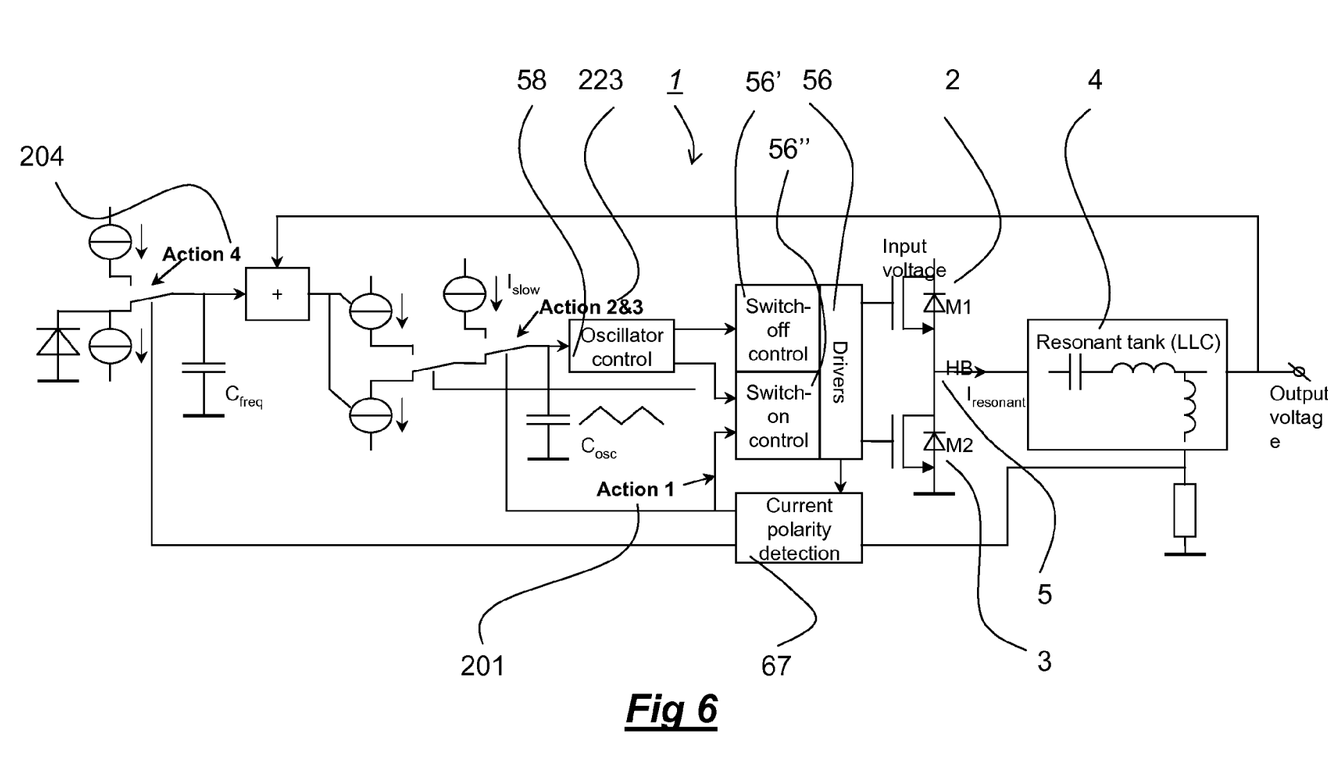
FIG. 6 shows an implementation of a method according to a further embodiment of the present invention.

A block diagram schematically depicting a circuit implementing a control algorithm to effect the method of the second embodiment is shown in FIG. 6. The block diagram of FIG. 6 is very similar to that of FIG. 5. However, in this instance the slope sensing means 57 is replaced by a current polarity detection means 67, and the slope start time-out means 59 is not required. Similarly to the operation of the control circuitry of FIG. 5 the current polarity detection means 67 is used to control the switch-on 56" and effect the first response action (201). The current polarity detection means 67 also, together with the oscillator control 58, effects the second and third response actions (223). The fourth response action (204) is, as in the previous instance, effected by charging the capacitor $C_{freq}$.

From reading the present disclosure, other variations and modifications will be apparent to the skilled person. Such variations and modifications may involve equivalent and other features which are already known in the art of energy converters and which may be used instead of, or in addition to, features already described herein. For example, in the first embodiment described above, as an alternative to continuous monitoring of the voltage and voltage slope, intermittent, high frequency polling may be used, or a differentiator to directly determine the voltage slope without recording or monitoring the absolute value of the voltage. Further, the switches used to implement the invention are not restricted to MOSFETs, but may include other power semiconductor devices, such as, for example, IGBTs (insulated gate bipolar transistors).

Moreover, it is not necessary to continuously monitor the voltage and/or voltage slope (or current, as the case may be). It is important only that the relevant parameters (such as voltage, voltage slope, or current) are monitored during the critical parts of the cycle, during which one of the switches is due to be switched on.

Further, references to phrases such as the "start [or end] of a non-zero voltage slope" are to be read purposively, and thus include, for instance, the use of filtering to avoid perturbation due to noise etc, or the inclusion of a lower thresh-hold below which a slope will be neglected. The phrase "start of a non-zero slope" may also be limited to a slope of the correct sign (positive or negative), as required.

The word "characteristic" is used herein having its normal meaning, and can indicate any significant feature of the parameter with which it is associated; thus where the parameter is a curve, characteristic may refer to, for instance, the start of a slope to the curve, or a knee (change in slope) in the curve, or change of polarity of the curve.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method for controlling an energy converter having a switching frequency and a switching phase, a first switch, a second switch, a half-bridge node therebetween, and an oscillator, the method comprising opening the first switch whilst the second switch is open,
monitoring a parameter indicative of a state of the energy converter, including monitoring the slope of the voltage at the half-bridge node, and both
(a) delaying closing the second switch;
(b) retarding the switching phase by interrupting oscillation of the oscillator in response to the parameter exhibiting a first characteristic when the first switch is opened;
(c) closing the second switch at the end of a first predetermined timeout period which starts immediately after the first switch is opened in response to the parameter exhibiting the first characteristic throughout the first predetermined timeout period, wherein the first characteristic is no voltage slope at the half-bridge node; and
(d) increasing the switching frequency in response to the parameter exhibiting the first characteristic throughout a second predetermined period which starts immediately after the first switch is opened.

2. The method according to claim 1, wherein the step (a) includes the further step of
(e) closing the second switch in response to the parameter exhibiting a second characteristic within a third predetermined period which starts immediately after the first switch is opened.

3. The method according to claim 1, wherein the energy converter has an input voltage, the parameter is the voltage across the second switch, and the first characteristic is a voltage across the second switch which is not less than half the input voltage.

4. The method according to claim 1, wherein the energy converter has an input voltage, the parameter is the voltage across the first switch and the first characteristic is a voltage across the first switch which is not greater than half the input voltage.

5. The method according to claim 1, wherein the energy converter has an input voltage, the parameter is the voltage across the first switch and the first characteristic is a voltage across the first switch which is not greater than a predetermined fixed voltage.

6. The method according to claim 1, wherein a high side switch is the first switch during a first part of the cycle time corresponding to the switching frequency and the second switch during the remainder of the cycle, and a low side switch is the second switch during a first part of the cycle and the first switch during the remainder of the cycle.

7. The method according to claim 2, wherein the third predetermined period is equal to the first predetermined period.

8. The method according to claim 2, wherein the first characteristic is an absence of a start of a non-zero voltage slope at the half-bridge node and the second characteristic is an end of a non-zero voltage slope at the half-bridge node.

9. The method according to claim 2, wherein the energy converter has an input voltage, the parameter is the voltage across the second switch, the first characteristic is a voltage across the second switch which is not less than half the input voltage and the second characteristic is a voltage across the second switch which is less than half the input voltage.

10. The method according to claim 2, wherein the energy converter has an input voltage, the parameter is the voltage across the first switch, the first characteristic is a voltage across the first switch which is not greater than half the input voltage and the second characteristic is a voltage across the first switch which is greater than half the input voltage.

11. The method according to claim 2, wherein the energy converter has an input voltage, the parameter is the voltage across the first switch, the first characteristic is a voltage across the first switch which is not greater than a predetermined fixed voltage and the second characteristic is a voltage across the first switch which is greater than the predetermined fixed voltage.

12. An energy converter having a switching frequency and a switching phase, a first switch and a second switch, a half-bridge node therebetween, and an oscillator and configured to be controlled by a method for controlling an energy converter having a switching frequency and a switching phase, a first switch, a second switch, a half-bridge node therebetween, and an oscillator, the method comprising
  opening the first switch whilst the second switch is open,
  monitoring a parameter indicative of a state of the energy converter, including monitoring the slope of the voltage at the half-bridge node,
and both
  (a) delaying closing the second switch;
  (b) retarding the switching phase by interrupting oscillation of the oscillator in response to the parameter exhibiting a first characteristic when the first switch is opened;
  (c) closing the second switch at the end of a first predetermined timeout period which starts immediately after the first switch is opened in response to the parameter exhibiting the first characteristic throughout the first predetermined timeout period, wherein the first characteristic is no voltage slope at the half-bridge node; and
  (d) increasing the switching frequency in response to the parameter exhibiting the first characteristic throughout a second predetermined period which starts immediately after the first switch is opened.

13. A switched mode power supply comprising the energy converter according to claim 12.

14. A method for controlling an energy converter having a switching frequency and a switching phase, a first switch, a second switch, a half-bridge node therebetween, and an oscillator, the method comprising
  opening the first switch whilst the second switch is open,
  monitoring a parameter indicative of a state of the energy converter, including monitoring the polarity of a current in the resonant circuit,
and both
  (a) delaying closing the second switch;
  (b) retarding the switching phase by interrupting oscillation of the oscillator in response to the parameter exhibiting a first characteristic when the first switch is opened wherein the first characteristic is an undesired polarity of the current in the resonant circuit;
  closing the second switch in response to the parameter exhibiting a second characteristic within a third predetermined period which starts immediately after the first switch is opened, wherein the second characteristic is an opposite polarity of the current in the resonant circuit; and
  increasing the switching frequency in response to the parameter exhibiting the first characteristic throughout a second predetermined period which starts immediately after the first switch is opened.

15. The method according to claim 14, wherein the undesired polarity is the polarity which tends to prevent the half-bridge node from discharging in the case that the first switch is a high side switch and from charging in the case that the first switch is a low side switch.

* * * * *